(12) United States Patent
Groat

(10) Patent No.: US 11,466,844 B1
(45) Date of Patent: Oct. 11, 2022

(54) ADJUSTABLE FIXTURE ALIGNMENT

(71) Applicant: CLAROLUX, Inc., Greensboro, NC (US)

(72) Inventor: Brian Groat, Greensboro, NC (US)

(73) Assignee: CLAROLUX, Inc., Greensboro, NC (US)

( * ) Notice: Subject to any disclaimer, the term of this patent is extended or adjusted under 35 U.S.C. 154(b) by 0 days.

(21) Appl. No.: 17/200,840

(22) Filed: Mar. 14, 2021

Related U.S. Application Data

(60) Provisional application No. 62/991,182, filed on Mar. 18, 2020.

(51) Int. Cl.
F21V 21/26 (2006.01)
F16C 11/10 (2006.01)
F21V 21/30 (2006.01)

(52) U.S. Cl.
CPC ............. F21V 21/26 (2013.01); F16C 11/10 (2013.01); F21V 21/30 (2013.01)

(58) Field of Classification Search
CPC .......... F21V 21/26; F21V 21/28; F21V 21/29; F21V 21/30; F21V 21/116; F16C 11/10
USPC .......................................................... 403/97
See application file for complete search history.

(56) References Cited

U.S. PATENT DOCUMENTS

| | | | | |
|---|---|---|---|---|
| 3,586,355 A * | 6/1971 | Magi | ....................... | F16C 11/10 403/91 |
| 4,614,452 A * | 9/1986 | Wang | ....................... | F16B 7/04 403/146 |
| 4,760,511 A * | 7/1988 | Russello | ................ | F21V 21/30 362/275 |
| 6,042,067 A * | 3/2000 | Mendelsohn | ....... | F21V 21/0824 248/213.2 |
| 6,059,429 A * | 5/2000 | Bodell | .................... | F16M 11/06 362/269 |
| 6,100,803 A * | 8/2000 | Chang | ..................... | F21V 21/30 250/221 |
| 6,161,948 A * | 12/2000 | Hagen | .................... | F16M 11/10 362/267 |
| 6,592,241 B1 * | 7/2003 | Kovacik | ................ | F16M 11/10 362/275 |
| 6,902,200 B1 * | 6/2005 | Beadle | .................... | F16C 11/04 285/185 |
| 7,373,861 B2 * | 5/2008 | Hsieh | ...................... | B25G 1/063 403/93 |
| 9,377,269 B2 * | 6/2016 | Bidigare | ................. | F41B 5/10 |
| 9,897,296 B1 * | 2/2018 | Baldwin | .............. | F21V 31/005 |
| 2002/0163811 A1 * | 11/2002 | Sipala | ................. | F21V 21/0965 362/398 |
| 2004/0202506 A1 * | 10/2004 | Lazic | .................... | F16M 11/12 403/97 |

(Continued)

Primary Examiner — Alexander K Garlen
Assistant Examiner — James M Endo
(74) Attorney, Agent, or Firm — MacCord Mason PLLC

(57) ABSTRACT

Mounting system, assemblies, and devices are shown and described. In one embodiment, a device to secure a fixture about an off-axis adjustment includes a lower knuckle having a plurality of sunken interior teeth, a distal attachment portion, and a threaded fastener aperture; an upper knuckle having a plurality of raised exterior teeth and a distal attachment portion; and a locking fastener to prevent rotation of the lower knuckle about the upper knuckle. The result is an assembly substantially rotational in a nonengaged position, and fixedly aligned in a coupled position.

5 Claims, 4 Drawing Sheets

(56) References Cited

U.S. PATENT DOCUMENTS

| | | | |
|---|---|---|---|
| 2004/0231489 A1* | 11/2004 | Chang | F16C 11/10 |
| | | | 84/327 |
| 2004/0233676 A1* | 11/2004 | Matts | F21V 21/14 |
| | | | 362/418 |
| 2015/0102187 A1* | 4/2015 | Hennessey | F16M 11/10 |
| | | | 248/122.1 |
| 2016/0222671 A1* | 8/2016 | Whitney | E04F 10/0651 |
| 2017/0045212 A1* | 2/2017 | Ghasabi | F21V 21/0824 |
| 2017/0198887 A1* | 7/2017 | Veloskey | F21V 17/02 |

* cited by examiner

ADJUSTABLE FIXTURE ALIGNMENT

This application claims the benefit of provisional application No. 62/991,182, filed Mar. 18, 2020, which is incorporated herein by reference in its entirety.

FIELD OF THE TECHNOLOGY

The present disclosure relates generally to fixture supports, and more particularly to improved adjustable, secured mounting devices and assemblies.

BACKGROUND

Classical mounting systems are affixed to a surface, or the like, for securing an accessory or fixture to the surface. Traditional mounting system may be mounted to the surface and an accessory can be temporarily aligned about the mounting system. However once secured, the alignment between elements in traditional systems often fails, for instance due to mechanical failure, outside contact, environmental factors, or similar situations. Further, traditional accessory or fixture securement has little adjustment, for example, to improve glare issues or to satisfy aesthetic preferences. Therefore, traditional systems often fail to facilitate sufficient adjustability and ensure properly maintained securement.

Therefore, Applicant desires devices, assemblies, and systems for adjustable fixture mounting without the drawbacks presented by the traditional systems and methods.

SUMMARY

In accordance with the present disclosure, mounting systems and assemblies are provided for a wide variety of applications to secure a plurality of differing fixtures about a surface, and the like. This disclosure provides improved assemblies and devices that are convenient, efficient, and safe for the user, particularly when used to adjust and maintain a fixture in a coupled position.

In one embodiment, in a light fixture assembly, a system comprises a first knuckle body having a first plurality of alignment teeth; a second knuckle body having a second plurality of alignment teeth adapted to engage with the corresponding first plurality of alignment teeth; and a locking fastener protruding into the first knuckle body to prevent movement of the first plurality of alignment teeth about the second plurality of alignment teeth.

In one embodiment, a universal adjustment assembly comprises a first knuckle body having a first plurality of alignment teeth, a distal portion having an axially extending opening, and a fastener aperture aligned about the first plurality of alignment teeth; a second knuckle body having a second plurality of alignment teeth adapted to engage with the corresponding first plurality of alignment teeth in an assembled position and having a distal portion with an axially extending opening; and a locking fastener adapted to protrude into the first knuckle body's fastener aperture to prevent movement of the first plurality of alignment teeth about the second plurality of alignment teeth, and wherein the first knuckle body being substantially rotational about the second knuckle body in a nonengaged position, and fixedly aligned in a coupled position.

In certain examples, the assembly includes a fixture that is generally secured adjacent the first distal portion. The assembly may include a light socket that is generally secured adjacent the first distal portion. The assembly fixture may be secured adjacent the second distal portion. The assembly may include a light socket secured adjacent the second distal portion. The assembly may include a ground stake secured adjacent the second distal portion.

In particular examples, the first knuckle body may be articulating about the second knuckle body only in a separated position to enable the assembly to be positioned at a plurality of angles. The first knuckle body may include a plurality of inner threads adapted to engage the second knuckle body external threads. The first knuckle body may include a sunken cavity recessed from a mounting engagement surface. The sunken cavity may include a sidewall, and wherein the sidewall supporting the first plurality of alignment teeth. The first plurality of alignment teeth may be spaced substantially along a diameter of the sunken cavity.

In certain examples, the assembly may include a plurality of axially extending opening protrudes from the sunken cavity and adapted to receive at least one electrical communication. The axially extending opening may traverse below the engagement surface and coaxially therewith the distal portion. The first knuckle body may include an alignment wall substantially perpendicular about the mounting engagement surface.

In one embodiment, a device to secure a fixture about an off-axis adjustment comprises a lower knuckle having a plurality of sunken interior teeth, a distal attachment portion, and a threaded fastener aperture; an upper knuckle having a plurality of raised exterior teeth and a distal attachment portion; and a locking fastener having threads engaged along the lower knuckle's fastener aperture threads and a distal portion removably secured about the upper knuckle, and wherein the locking fastener prevents rotation of the lower knuckle about the upper knuckle, and wherein the lower knuckle is rotational about the upper knuckle in a disassembled position.

In certain examples, the lower knuckle is adapted to align at a plurality of adjustment points about the upper knuckle. The lower knuckle may provide a plurality fine tune offset angles about the upper knuckle. The lower knuckle may include a substantially flat mounting engagement surface, a cavity having a sidewall supporting the plurality of alignment teeth spaced substantially along a diameter of the cavity, and an alignment wall substantially perpendicular about a mounting engagement surface; and the upper knuckle may include a substantially flat alignment surface, an alignment ring extending from the alignment surface and supporting the plurality of alignment teeth. Further, the upper knuckle may include a shoulder substantially perpendicular about an alignment surface.

In one embodiment, a device to secure a fixture about an off-axis adjustment includes lower knuckle, an upper knuckle, and a locking fastener. The lower knuckle may have a plurality of sunken interior teeth, a distal attachment portion, and a threaded fastener aperture. The upper knuckle may have a plurality of raised exterior teeth and a distal attachment portion. The locking fastener may have threads engaged along the lower knuckle's fastener aperture threads and a distal portion removably secured about the upper knuckle. The locking fastener may prevent rotation of the lower knuckle about the upper knuckle.

In some examples, the upper knuckle's raised exterior teeth align adjacent the lower knuckle's sunken interior teeth. The lower knuckle may be rotational about the upper knuckle in a disassembled position. The lower knuckle may align at a plurality of adjustment points about the upper knuckle. The lower knuckle may provide a plurality fine tune offset angles about the upper knuckle. The lower knuckle's distal portion may include an axially extending opening. The axially extending opening may receive at least one electrical communication. The lower knuckle may include a substantially flat mounting engagement surface. The lower knuckle may include a cavity having a sidewall supporting the plurality of alignment teeth. The plurality of alignment teeth may be spaced substantially along a diameter of the cavity.

In certain examples, an axially extending opening may protrude from the cavity. The axially extending opening may traverse below an engagement surface and coaxially therewith the distal portion. The axially extending opening may be positioned substantially parallel about a mounting engagement surface.

In some examples, the lower knuckle may include an alignment wall substantially perpendicular about a mounting engagement surface. The lower knuckle's distal portion may include threads. The upper knuckle may include a substantially flat alignment surface. The upper knuckle may include an alignment ring extending from the alignment surface. The alignment ring may support the plurality of alignment teeth. The alignment teeth may be uniformly spaced substantially along an exterior perimeter of the alignment ring. The alignment ring may have an outer diameter substantially dimensioned to mate within an inner diameter of a sunken cavity of the first knuckle body. The axially extending opening may protrude below the alignment ring. The axially extending opening may receive at least one electrical communication. The axially extending opening may protrude below an alignment surface. The axially extending opening may traverse below the engagement surface and coaxially therewith the distal portion. The axially extending opening may be positioned substantially parallel about a mounting alignment surface.

In certain examples, the upper knuckle includes a shoulder substantially perpendicular about an alignment surface. The upper knuckle's distal portion may include threads.

In another embodiment, a universal adjustment assembly includes a first knuckle body having a first plurality of alignment teeth, a distal portion having an axially extending opening, and a fastener aperture aligned about the first plurality of alignment teeth; a second knuckle body having a second plurality of alignment teeth adapted to engage with the corresponding first plurality of alignment teeth in an assembled position and having a distal portion with an axially extending opening; and a locking fastener adapted to protrude into the first knuckle body's fastener aperture to prevent movement of the first plurality of alignment teeth about the second plurality of alignment teeth.

In some examples, the assembly may include a fixture. The fixture may be secured about the first distal portion. The assembly may include a light socket secured about the first distal portion. The assembly may include a ground stake secured about the first distal portion. The fixture assembly may be secured about the second distal portion. The assembly may include a light socket secured about the second distal portion. The assembly may include a ground stake secured about the first distal portion.

In certain examples, the first knuckle body may be substantially rotational about the second knuckle body in a nonengaged position, and fixedly aligned in a coupled position. The first knuckle body may be articulating about the second knuckle body to enable the assembly to be positioned at a plurality of angles. The first knuckle body may include a plurality of inner threads adapted to engage the second knuckle body external threads. The first knuckle body may include a substantially flat mounting engagement surface. The first knuckle body may include a sunken cavity recessed from the mounting engagement surface. The sunken cavity may include a sidewall. The sidewall may support the first plurality of alignment teeth. The first plurality of alignment teeth are may include alignment teeth. The first plurality of alignment teeth may be spaced substantially along a diameter of the sunken cavity. The axially extending opening may protrude from the sunken cavity. The axially extending opening may receive at least one electrical communication. The axially extending opening may traverse below the engagement surface and coaxially therewith the distal portion. The axially extending opening may be positioned substantially parallel about the mounting engagement surface.

In some examples, the first knuckle body includes an alignment wall substantially perpendicular about the mounting engagement surface. The first knuckle body's distal portion may include threads. The locking fastener includes at least a partially threaded shaft. The locking fastener may include a length adapted to protrude entirely through the first knuckle body. The locking fastener length may fixedly engage the second knuckle body, wherein the first knuckle body being removably affixed about the second knuckle body.

In certain examples, the locking fastener comprises a threaded ball stud. The locking fastener may include a cap. The second knuckle body may include a substantially flat alignment surface. The second knuckle body may include an alignment ring extending from the alignment surface. The alignment ring may support the second plurality of alignment teeth. The second plurality of alignment teeth may be indexed alignment teeth. The second plurality of alignment teeth may be uniformly spaced substantially along an exterior perimeter of the alignment ring. The alignment ring may include an outer diameter substantially dimensioned to mate within an inner diameter of a sunken cavity of the first knuckle body when the corresponding first knuckle and second knuckle teeth are aligned adjacent one another. The axially extending opening may protrude below the alignment ring. The axially extending opening may receive at least one electrical communication. The axially extending opening may protrude below the alignment surface. The axially extending opening may traverse below the engagement surface and coaxially therewith the distal portion. The axially extending opening may be positioned substantially parallel about the mounting alignment surface. The second knuckle body may include a shoulder substantially perpendicular about the alignment surface. The second knuckle body's distal portion may include threads.

In another embodiment, a method of manufacturing an adjustment assembly comprising a first knuckle body having a first plurality of alignment teeth, a distal portion having an axially extending opening, and a fastener aperture aligned about the first plurality of alignment teeth; and a second knuckle body having a second plurality of alignment teeth adapted to engage with the corresponding first plurality of alignment teeth in an assembled position and having a distal portion with an axially extending opening.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
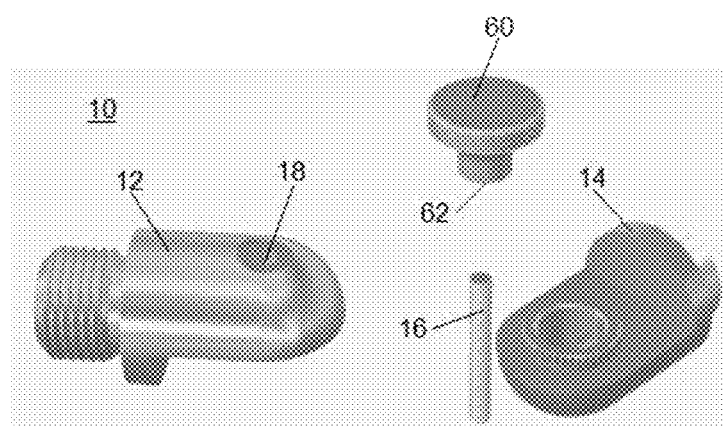
FIG. 1 is an exploded perspective view of one embodiment of an assembly according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
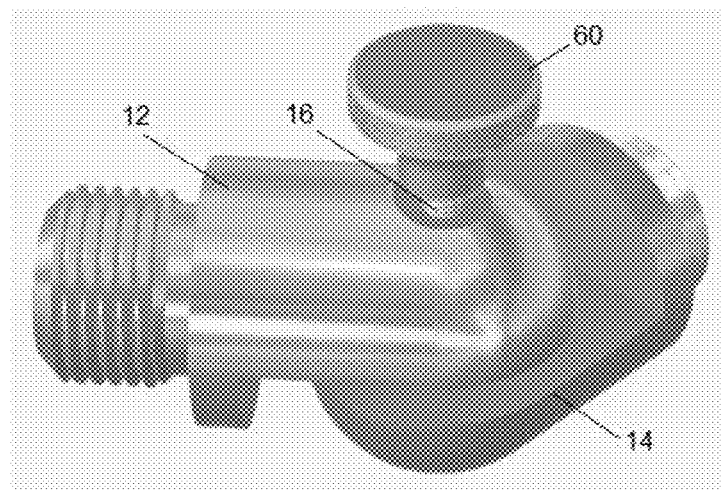
FIG. 2 is a partially exploded perspective view of the embodiment introduced in FIG. 1.
Figure 4:
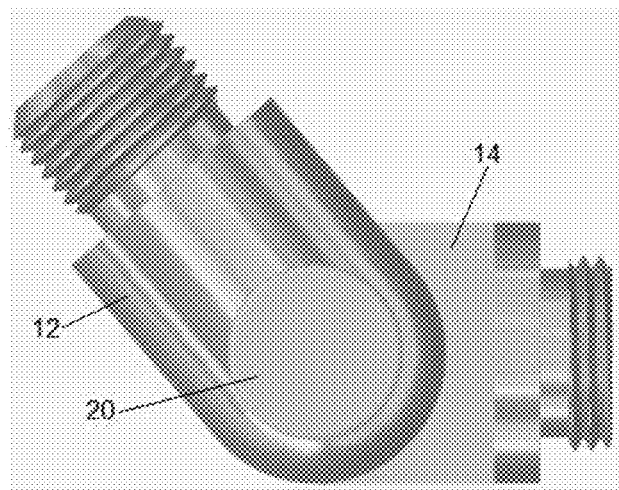
FIG. 4 is a bottom perspective view of the assembled embodiment introduced in FIG. 1.
Figure 5:
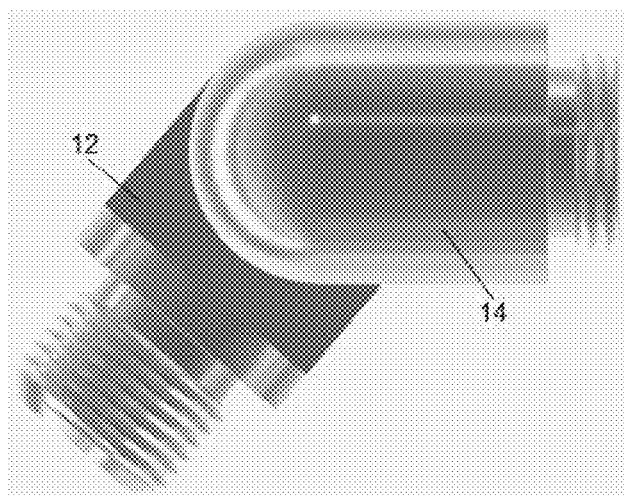
FIG. 5 is a top perspective view of the assembled embodiment introduced in FIG. 1.

Referring now to the drawings in general and FIGS. 4 and 5 in particular, it will be understood that the illustrations are for the purpose of describing embodiments of the disclosure and are not intended to limit the disclosure or any inventions thereto. As best seen in FIGS. 1 and 2, a universal adjustment device 10 is shown embodied according to the present disclosure to secure a fixture about an off-axis adjustment to provide various alignment and connection orientations as understood by those skilled in the art having the benefit of this disclosure. Further, those skilled in the art having the benefit of this disclosure will recognize additional fixture and features, including, but not limited to, lighting fixtures, advantageously supported by the novel universal adjustment device 10.

As shown in FIG. 1, one embodiment of the device 10 to secure a fixture about an off-axis adjustment includes a first knuckle 12 and a second knuckle 14 secured together with locking fastener 16 in any of the coupled positions shown and described herein. Unexpectantly, Applicant has discovered unforeseen advantages of disallowing rotation, adjustability, and the like between knuckle bodies 12, 14 when assembled in the coupled position with locking fastener 16, or the like, for instance during downstream contact and manipulation after setup, or the like. Those of ordinary skill having the benefit of this disclosure will recognize additional advantages of stopping adjustability and rotational aspects of the varying elements once assembled in the coupled position as shown and described herein.

Figure 6:
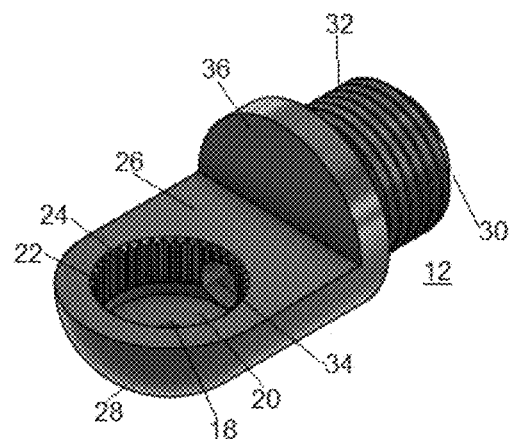
FIG. 6 is a perspective view of isolated elements of the embodiment introduced in FIG. 1.
Figure 7:
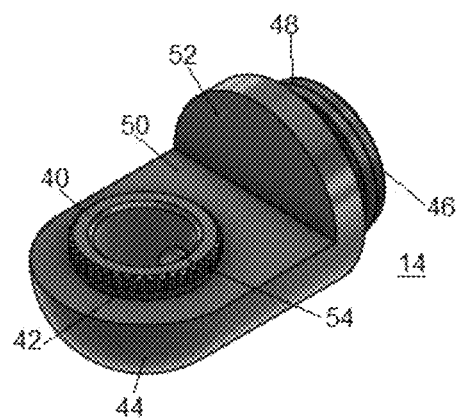
FIG. 7 is a perspective view of isolated elements of the embodiment introduced in FIG. 1.

As introduced in FIGS. 6 and 7, the universal device 10 includes a first knuckle body 12 having a first plurality of alignment teeth 24, a distal portion 30 having an axially extending opening 34, and a fastener aperture 18 aligned about the first plurality of alignment teeth 24; a second knuckle body 14 having a second plurality of alignment teeth 42 adapted to engage with the corresponding first plurality of alignment teeth 24 in an assembled position and having a distal portion 46 with an axially extending opening 54; and a locking fastener 16 adapted to protrude into the first knuckle body's 12 fastener aperture 18 to prevent movement of the first plurality of alignment teeth 24 about the second plurality of alignment teeth 42. As shown and described herein, any of the plurality of alignment teeth may include any number, orientation, dimension, etc. of teeth.

In some examples, the assembly may generally support a fixture assembly, extension, or fixture itself, including, but not limited to, a lighting fixture. The fixture may be secured about the first distal portion 30. The assembly may include a light socket secured about the first distal portion 30. The assembly may include a ground stake secured about the first distal portion 30. The fixture assembly may be secured about the second distal portion 46. The assembly may include a light socket secured about the second distal portion 46. The assembly may include a ground stake secured about the second distal portion 46.

Figure 3:
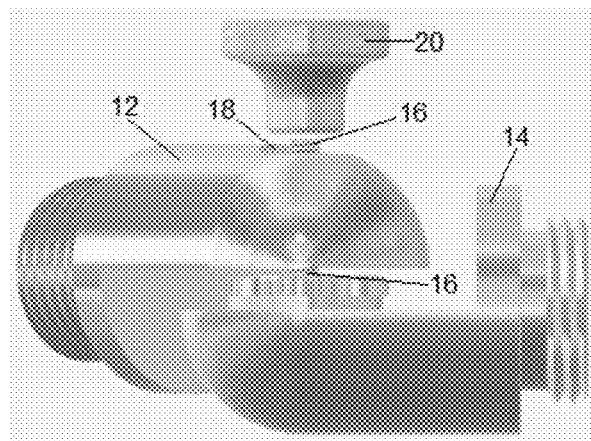
FIG. 3 is a partially exploded side view of the embodiment introduced in FIG. 1.
Figure 3A:
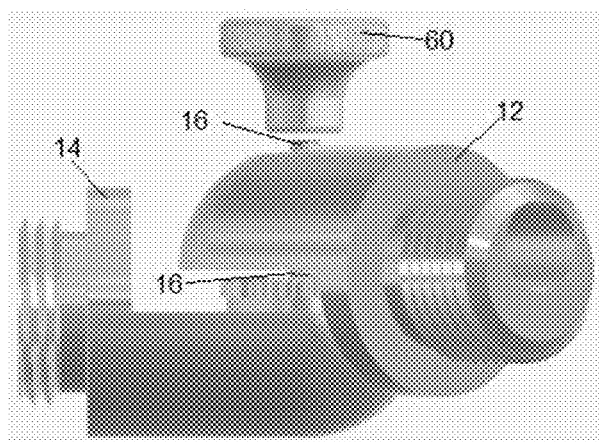
FIG. 3a is a partially exploded side view of the embodiment introduced in FIG. 1.

As introduced in FIGS. 3 and 3a, the first knuckle body 12 may be substantially rotational about the first knuckle body 14 in a nonengaged position to provide a variety of unique alignment and adjustment positions, and fixedly aligned in a coupled position. The first knuckle body 12 may be articulating about the first knuckle body 14 to enable the assembly to be positioned at a plurality of angles. The first knuckle body 12 may include a plurality of inner threads adapted to engage the first knuckle body 14 external threads. The first knuckle body 12 may include a substantially flat mounting engagement surface 26. The first knuckle body 12 may include a sunken cavity 20 recessed from the mounting engagement surface 26. The sunken cavity 20 may include a sidewall 22. The sidewall 22 may support the first plurality of alignment teeth 24. The first plurality of alignment teeth 24 may include indexed alignment teeth. The first plurality of alignment teeth 24 may be spaced substantially along a diameter of the sunken cavity 20. The axially extending opening 34 may protrude from the sunken cavity 20. The axially extending opening 34 may receive at least one electrical communication. The axially extending opening 34 may traverse below the engagement surface and coaxially therewith the 30. The axially extending opening 34 may be positioned substantially parallel about the mounting engagement surface 26.

In some examples, the first knuckle body 12 includes an alignment wall 36 substantially perpendicular about the mounting engagement surface 26. The first knuckle body's 12 distal portion 30 may include threads 32. The locking fastener 16 includes at least a partially threaded shaft. The locking fastener 16 may include a length adapted to protrude entirely through the first knuckle body 12. The locking fastener 16 length may fixedly engage the second knuckle body 14, wherein the first knuckle body 12 being removably affixed about the second knuckle body 14.

In certain examples, the locking fastener 16 comprises a threaded ball stud. The locking fastener 16 may include a cap 60 to facilitate securing and/or removing the locking fastener 16. The second knuckle body 14 may include a substantially flat alignment surface 50. The second knuckle body 14 may include an alignment ring 40 extending from the alignment surface 50. The alignment ring 40 may support the second plurality of alignment teeth 42. The second plurality of alignment teeth 42 may be indexed alignment teeth. The second plurality of alignment teeth 42 may be uniformly spaced substantially along an exterior perimeter of the alignment ring 40 to facilitate any degree of connection and alignment, including unexpected advantages of fine tuning and the like with the corresponding first knuckle body 12. The alignment ring 40 may include an outer diameter substantially dimensioned to mate within an inner diameter of a sunken cavity 20 of the first knuckle body 12 when the corresponding first knuckle and second knuckle teeth are aligned adjacent one another. The axially extending opening 54 may protrude below the alignment ring 40. The axially extending opening 54 may receive at least one electrical communication. The axially extending opening 54 may protrude below the alignment surface 50. The axially extending opening 54 may traverse below the engagement surface and coaxially therewith the second distal portion 46. The axially extending opening 54 may be positioned substantially parallel about the mounting alignment surface 50. The second knuckle body may include a shoulder 52 substantially perpendicular about the alignment surface 50. The second knuckle body's distal portion 46 may include threads 48.

In one embodiment, a device 10 securing a fixture about an off-axis adjustment includes lower knuckle 12, an upper knuckle 14, and a locking fastener 16. The lower knuckle 12 may have a plurality of sunken interior teeth 24, a distal attachment portion 30, and a threaded fastener aperture 18. The upper knuckle 14 may have a plurality of raised exterior teeth 42 and a distal attachment portion 46. The locking fastener 16 may have threads engaged along the lower knuckle's 12 fastener aperture threads and a distal portion removably secured about the upper knuckle 14, for instance engaging corresponding threads or any similar fastening feature. The locking fastener 16 may prevent rotation of the lower knuckle 12 about the upper knuckle 14.

As shown in FIGS. 3 and 3a, the upper knuckle's 14 raised exterior teeth 42 align adjacent the lower knuckle's 12 sunken interior teeth 24. The lower knuckle 12 may be rotational about the upper knuckle 14 only in a disassembled position. The lower knuckle 12 may align at a plurality of adjustment points about the upper knuckle 14. The lower knuckle 12 may provide a plurality fine tune offset angles about the upper knuckle 14. The lower knuckle's 12 distal portion may include an axially extending opening. The axially extending opening may receive at least one electrical communication. The lower knuckle 12 may include a substantially flat mounting engagement surface 26. The lower knuckle 12 may include a cavity 20 having a sidewall 22 supporting the plurality of alignment teeth 24. The plurality of alignment teeth 24 may be spaced substantially along a diameter of the cavity 20, or partially aligned along the diameter in alternative embodiments.

In certain examples having electrical connections, an axially extending opening 34 may protrude from the cavity 20 to provide internal wiring connections and the like. The axially extending opening 34 may traverse below an engagement surface and coaxially therewith the distal portion. The axially extending opening may be positioned substantially parallel about a mounting engagement surface 26.

In some examples, the lower knuckle 12 may include an alignment wall 36 substantially perpendicular about a mounting engagement surface 26, for instance to provide blocking and aesthetic functionality. The lower knuckle's 12 distal portion may include threads 32. The upper knuckle 14 may include a substantially flat alignment surface 50. The upper knuckle 14 may include an alignment ring 40 extending from the alignment surface 50. The alignment ring 40 may support the plurality of alignment teeth. The alignment teeth may be uniformly spaced substantially along an exterior perimeter of the alignment ring 40, while alternative embodiments include teeth only along a portion(s) of the perimeter. The alignment ring 40 may have an outer diameter substantially dimensioned to mate within an inner diameter of a sunken cavity 20 of the first knuckle body 12 only when the opposing teeth of the knuckle bodies are mated adjacent together. The axially extending opening 54 may protrude below the alignment ring 40. The axially extending opening 54 may receive at least one electrical communication. The axially extending opening 54 may protrude below an alignment surface 50. The axially extending opening 54 may traverse below the engagement surface 50 and coaxially, or similar, therewith the distal portion 46. The axially extending opening 54 may be positioned substantially parallel about a mounting alignment surface 50. Further, the upper knuckle 14 may include a shoulder 52 substantially perpendicular about an alignment surface 50 to provide blocking and/or aesthetic features. The upper knuckle's 14 distal portion may include threads 48.

In some examples, the method includes brouching the first plurality of alignment teeth. The method may include brouching about forty internal alignment teeth. The method may include brouching about a forty five degree chamfer. The method may include brouching the second plurality of alignment teeth. The method may include brouching about forty internal alignment teeth. Further, in certain examples, the method includes casting any of the elements shown and described herein.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A device to secure a fixture about an off-axis adjustment, said device comprising:
    a. a lower knuckle having a flat mounting engagement surface, a plurality of sunken interior teeth aligned adjacent and perpendicular to said flat mounting engagement surface, a first distal portion having an axially extending opening, and a threaded fastener aperture aligned about said plurality of sunken interior teeth;
    b. an upper knuckle having a flat alignment surface, and a plurality of raised exterior teeth adapted to engage with said plurality of sunken interior teeth and aligned adjacent and perpendicular to said flat alignment surface, and a distal attachment portion; and
    c. a locking fastener having threads engaged along said threaded fastener aperture of said lower knuckle and a distal portion removably secured about said upper knuckle,
    and wherein said locking fastener prevents rotation of said lower knuckle about said upper knuckle,
    wherein said lower knuckle is rotational about said upper knuckle in a disassembled position, and
    wherein said lower knuckle includes a cavity having a sidewall supporting said plurality of sunken interior teeth spaced substantially along a diameter of said cavity, and said axially extending opening protrudes from said cavity and traverses below said flat mounting engagement surface.

2. The device of claim 1, wherein said lower knuckle is adapted to align at a plurality of adjustment points about said upper knuckle.

3. The device of claim 1, wherein said lower knuckle is adapted to provide a plurality fine tune offset angles about said upper knuckle.

4. The device of claim 1, wherein said upper knuckle includes an alignment ring extending from said alignment surface and supporting said plurality of raised exterior teeth.

5. The device of claim 1, wherein said upper knuckle includes a shoulder substantially perpendicular about an alignment surface.

\* \* \* \* \*